United States Patent [19]
Kao

[11] Patent Number: 5,867,414
[45] Date of Patent: Feb. 2, 1999

[54] COMPACT PIPELINED MATRIX MULTIPLIER UTILIZING ENCODING AND SHIFTING CIRCUIT CONFIGURATIONS

[75] Inventor: Jinn-Nan Kao, Taipei, Taiwan

[73] Assignee: Industrial Technology Research Institute, Hsinchu, Taiwan

[21] Appl. No.: 291,971

[22] Filed: Aug. 17, 1994

[51] Int. Cl.[6] .............................. G06F 7/52; G06F 17/16
[52] U.S. Cl. .............................. 364/754.02; 364/760.02; 364/760.04
[58] Field of Search ................................... 364/754, 760, 364/725

[56] References Cited

U.S. PATENT DOCUMENTS

| | | | |
|---|---|---|---|
| 4,153,938 | 5/1979 | Ghest et al. | 364/760 |
| 4,493,048 | 1/1985 | Kung et al. | 364/754 |
| 4,719,588 | 1/1988 | Tatemichi et al. | 364/754 |
| 4,748,582 | 5/1988 | New et al. | 364/754 |
| 4,910,700 | 3/1990 | Hartley et al. | 364/754 |
| 5,038,315 | 8/1991 | Rao | 364/760 |
| 5,204,830 | 4/1993 | Wang et al. | 364/754 |
| 5,220,525 | 6/1993 | Anderson et al. | 364/760 |

*Primary Examiner*—David H. Malzahn
*Attorney, Agent, or Firm*—Bo-In Lin

[57] ABSTRACT

A circuit and algorithm for multiplying three matrices includes plurality of processor element (PE) column. Each PE column includes a plurality of processor element (PE) units and each unit includes a data register for receiving and storing a plurality sets of numbers of a row of a first matrix and a corresponding column of a second matrix. Each of the PE units is connected to another PE units of the PE column sequentially transmitting the sets of numbers between the registers in a time progressive manner. Each of the PE units further includes a multiplication processing unit for receiving a plurality of bits of the sets of numbers from the [storage means] register, the multiplication processing unit processes the plurality of bits to generate a partial processing result At least one of the PE units using the partial processing result generates a multiplication of the sets of numbers whereby each of the PE column performs a matrix multiplication of a column of the second matrix. Since the number of PE columns is equal to the number of columns of the second matrix, the multiplication circuit thus performs a multiplication of the first matrix to the second matrix.

10 Claims, 7 Drawing Sheets

COMPACT PIPELINED MATRIX MULTIPLIER UTILIZING ENCODING AND SHIFTING CIRCUIT CONFIGURATIONS

BACKGROUND OF THE INVENTION

1. Field of the Invention

This invention relates generally to a circuit for matrix multiplication. More particularly, this invention relates to a compact pipelined matrix multiplier implemented as integrated circuit (IC) with faster multiplication operation and reduced occupied area on the IC chip by the use of an encoding and shifting circuit configuration.

2. Description of the Prior Art

Matrix multiplications are commonly performed under various circumstances for different applications. In order to carry out the multiplications expeditiously, the multiplication algorithm are generally implemented in hardware by use of special IC circuit designs. Recent trend of miniaturization in manufacturing ever smaller electronic devices has placed a greater demand on the techniques to design the circuits such that the area occupied by the circuits on an IC chip is minimized. A circuit structure which has a feature capable of enabling an IC circuit design in reducing the size of circuit area on a chip can be applied to a broad spectrum of applications to further miniaturize the electronic devices.

One specific application of matrix multiplication is in the area of video image data compression where a two-dimensional discrete cosine transform (DCT) is performed. For a N×N data matrix, a two dimensional discrete cosine transform is defined as:

$$Z(K_1,K_2) = \frac{4C(K_1)C(K_2)}{N^2} \sum_{n_1=0}^{N} \sum_{n_2=0}^{N} X(n_1,n_2)\cos\frac{(2n_1+1)K_1\pi}{2N} \cos\frac{(2n_2+1)K_2\pi}{2N} \quad (1a)$$

An inversion transform can be similarly carried out by:

$$X(n_1,n_2) = \sum_{K_1=0}^{N-1} \sum_{K_2=0}^{N-1} C(K_1)C(K_2)Z(K_1,K_2)\cos\frac{(2n_1+1)K_1\pi}{2N} \cos\frac{(2n_2+1)K_2\pi}{2N} \quad (1b)$$

where $C(x) = \begin{cases} 1/2^{**}(0.5) & \text{for } K = 0 \\ 1 & \text{for } K \neq 0 \end{cases}$ $X(n_1, n_2)$ is the input data matrix and $Z(K_1,K_2)$ is the matrix of transform coefficients.

Equation (1a) can be written in matrix form $$Z = CXC^t \quad (2)$$

where C stands for the cosine coefficient matrix and $C^t$ stands for the transpose of C.

In a more detailed version, equation (2) can be rewritten as $$\begin{pmatrix} Z_{11} & Z_{12} & \ldots & Z_{1N} \\ Z_{21} & Z_{22} & \ldots & Z_{2N} \\ Z_{N1} & Z_{N2} & \ldots & Z_{NN} \end{pmatrix} = \begin{pmatrix} C_{11} & C_{12} & \ldots & C_{1N} \\ C_{21} & C_{22} & \ldots & C_{2N} \\ C_{N1} & C_{N2} & \ldots & C_{NN} \end{pmatrix} \begin{pmatrix} X_{11} & X_{12} & \ldots & X_{1N} \\ X_{21} & X_{22} & \ldots & X_{2N} \\ X_{N1} & X_{N2} & \ldots & X_{NN} \end{pmatrix} \begin{pmatrix} C^t_{11} & C^t_{12} & \ldots & C^t_{1N} \\ C^t_{21} & C^t_{22} & \ldots & C^t_{2N} \\ C^t_{N1} & C^t_{N2} & \ldots & C^t_{NN} \end{pmatrix} \quad (3)$$

where $C^t_{ij} = C_{ij}$.

There are three N×N matrices multiplying with each other. We can thus define a matrix $Y = XC^t$ or $$\begin{pmatrix} Y_{11} & Y_{12} & \ldots & Y_{1N} \\ Y_{21} & Y_{22} & \ldots & Y_{2N} \\ Y_{N1} & Y_{N2} & \ldots & Y_{NN} \end{pmatrix} = \begin{pmatrix} X_{11} & X_{12} & \ldots & X_{1N} \\ X_{21} & X_{22} & \ldots & X_{2N} \\ X_{N1} & X_{N2} & \ldots & X_{NN} \end{pmatrix} \begin{pmatrix} C^t_{11} & C^t_{12} & \ldots & C^t_{1N} \\ C^t_{21} & C^t_{22} & \ldots & C^t_{2N} \\ C^t_{N1} & C^t_{N2} & \ldots & C^t_{NN} \end{pmatrix} \quad (4)$$

the matrix can be written as $$\begin{pmatrix} Z_{11} & Z_{12} & \ldots & Z_{1N} \\ Z_{21} & Z_{22} & \ldots & Z_{2N} \\ Z_{N1} & Z_{N2} & \ldots & Z_{NN} \end{pmatrix} = \begin{pmatrix} C_{11} & C_{12} & \ldots & C_{1N} \\ C_{21} & C_{22} & \ldots & C_{2N} \\ C_{N1} & C_{N2} & \ldots & C_{NN} \end{pmatrix} \begin{pmatrix} Y_{11} & Y_{12} & \ldots & Y_{1N} \\ Y_{21} & Y_{22} & \ldots & Y_{2N} \\ Y_{N1} & Y_{N2} & \ldots & Y_{NN} \end{pmatrix} \quad (5)$$

In a two-by-two example, the equation (4) reduces itself to $$\begin{pmatrix} Y_{11} & Y_{12} \\ Y_{21} & Y_{22} \end{pmatrix} = \begin{pmatrix} X_{11} & X_{12} \\ X_{21} & X_{22} \end{pmatrix} \begin{pmatrix} C^t_{11} & C^t_{12} \\ C^t_{21} & C^t_{22} \end{pmatrix} \quad (6)$$

and equation (5) reduces itself to $$\begin{pmatrix} Z_{11} & Z_{12} \\ Z_{21} & Z_{22} \end{pmatrix} = \begin{pmatrix} C_{11} & C_{12} \\ C_{21} & C_{22} \end{pmatrix} \begin{pmatrix} Y_{11} & Y_{12} \\ Y_{21} & Y_{22} \end{pmatrix} \quad (7)$$

The prior art techniques for DCT matrix multiplication have several limitations. In the case when a row-column decomposition method is used, a transposed memory is required. A solution with heavily pipeline data flow would become very difficult to implement in actual circuit designs.

Under the circumstances when a direct two-dimensional DCT is implemented, the costs for hardware design and manufacturing is relatively too high compared with the benefits that could potentially gain from the intended hardware implementations. Furthermore, the proposed techniques generally lack a characteristics of modularization and require highly convoluted and complex circuit structures thus making the actual implementation very time consuming and inefficient.

A modularized circuit design to implement a matrix multiplication algorithm is provided in a prior patent application by the inventor of the present invention. (patent application with Ser. No. 07/836,075 entitled "Fast Pipelined Matrix Multiplier" which was issued on Apr. 20, 1993 as U.S. Pat. No. 5,204,830) A pipeline structure is used in U.S. Pat. No. 5,248,830 wherein a plurality of registers and multiplexers are configured in a top-down architecture forming a plurality of bit multiplication element, i.e., processing elements (PEs). The multiplication is performed in a time progressive manner one bit a time in each processing element from the top to the bottom. In addition to the top-down pipeline configuration, the multiplier further has an advantage where the multiplications are performed in a parallel manner, i.e., each element of a row and the corresponding column of the multiplied matrix are processed in one of many top-down processing columns simultaneously in a parallel manner. Because of the simplicity of the design and the pipeline and parallel processing architecture, the multiplier can be designed and manufactured very economically. The cost of hardware implementation is greatly reduced from that of the earlier techniques. The modular structure further enables the circuits to be conveniently applied to perform multi-stage matrix multiplications without requiring major circuit design efforts.

However, this pipeline multiplier may encounter a different potential hardware limitation under some special circumstances. Since each of the plurality of bit-multiplication elements, i.e., PEs, processes one bit per clock cycle, the number of registers and multiplexers may be incremental to a large number as the number of bits of individual matrix elements and the numbers of columns and rows of the matrices increase. Specifically, for an 8×8 DCT matrix multiplication, the S-box and matrix of accumulator arrays as shown in FIG. 6 and 6A in Wang et al. require an array of 64 accumulator and very complicate time-control switches. Large circuit areas are occupied on an IC chip by these accumulator arrays and time-control switches which reduced the usefulness of this pipelined matrix multiplier. The requirement to miniaturize the electronic devices strongly demand that the number of electronic circuit components on an IC chips be reduced. Large number of registers, accumulators and associated interconnecting lines for time control switches as disclosed in Wang et al. occupy too much areas on an IC chip which could make the hardware implementation incompatible with some manufacturing specifications.

Therefore, a need still exits in the art to reduce the number of the circuit components in a pipeline multiplier whereby the pipeline/parallel multiplication configuration can be further improved for implementation in a broader range of applications.

SUMMARY OF THE PRESENT INVENTION

It is therefore an object of the present invention to provide a matrix-multiplication algorithm and circuit design which processes at least two bits in each clock cycle utilizing a multiple bits encoding and shifting circuit structure whereby the circuit area can be reduced.

Another object of the present invention is to provide a matrix multiplication algorithm and circuit design which satisfies the precision benchmark requirements under the CCITT (Comite Consultatif International du Telegraphe et des Telephones) proposed standard for IDCT utilizing the pipeline and parallel processing architecture with reduced circuit area on an IC chip.

Another object of the present invention is to provide a two stage pipelined matrix multiplier which allow the intermediate testing functions whereby the accuracy of the multiplication can be more readily checked Briefly, in a preferred embodiment, the present invention comprises a multiplication circuit which includes a plurality of processor element (PE) column each including a plurality of processor element (PE) units each unit including a storage means receiving and storing a plurality sets of numbers of a row of a first matrix and a corresponding column of a second matrix. Each of the PE units connecting to another PE units of the PE column sequentially transmitting the sets of numbers between the storage means in a time progressive manner. Each of the PE units further includes a multiplication means receiving a plurality of bits of the sets of numbers from the storage means, the multiplication means processing the plurality of bits to generate a partial processing result. At least one of the multiplication means using the partial processing result generating a multiplication of the sets of numbers whereby each of the PE column performs a matrix multiplication of a row of the second matrix and the multiplication circuit performs a matrix multiplication.

An advantage of the present invention is that it provides a matrix-multiplication algorithm and circuit design which utilizes a multiple bits encoding and shifting circuit to process at least two bits in each clock cycle whereby the circuit area can be reduced.

It is another advantage of the present invention that it provides a matrix multiplication algorithm and circuit design which satisfies the precision benchmark requirements under the CCITT proposed standard for IDCT utilizing the pipeline and parallel processing architecture with reduced circuit area on an IC chip.

Another advantage of the present invention is that it provides a pipelined matrix multiplier with circuit structure which provides intermediate testing functions whereby the accuracy of the multiplication can be more readily checked These and other objects and the advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1:
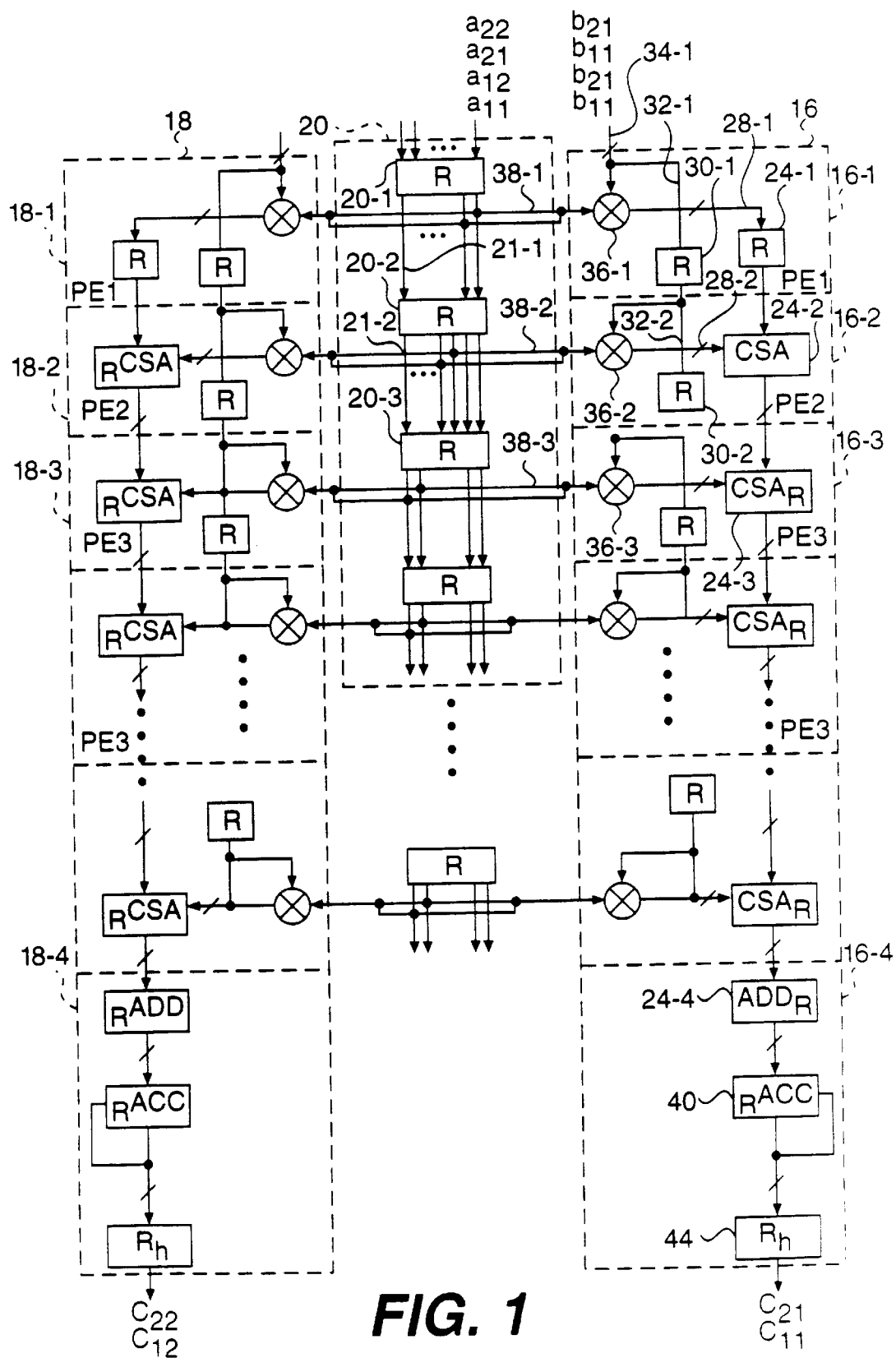
FIG. 1 shows a two-by-two matrix multiplier circuit of the present invention.

FIG. 1 shows a matrix multiplier circuit 10 according to the present invention. The multiplier circuit 10 is used to perform a two-by-two matrix multiplication, i.e. A×B=C where A B and C represent three matrices each has two columns and two rows. The multiplier 10 includes two identical parallel columns, i.e., column 16 and column 18 wherein the column 16 is used to perform the multiplication of the elements of matrix A and the first column of the matrix B and the column 18 is used to perform the multiplication of the elements of the matrix A by the elements of the second columns of B. The operations of columns 16 and 18 can be carried out in parallel. Similar to the multiplication as performed by the pipeline multiplier disclosed in U.S. Pat. No. 5,204,830, the structure of columns 16 and 18 are configured in a top-down manner wherein the multiplication is performed sequentially from the top to the bottom.

Each of the processing element columns, i.e., columns 16 and 18 comprises a plurality of processing element (PE) units depicted as PE1(16-1), PE2 (16-2), PE3 (16-4), , and PE1 (18-1), PE2 (18-2), . . . , PE3 (18-4) respectively. The PE1 and PE2 units are used to perform the multiplication in a sequential manner wherein each processing unit carries out the multiplication of certain number of bits in a pipeline fashion. At the beginning of each clock-cycle, the contents of one level of processing unit are transmitted to a next level for further process where the multiplication of next set of bits are then carried out. Therefore, the total number of PE1 and PE2 units are dependent on the number of bits of the matrix elements to be multiplied and the number of bits processed by each processing unit For example, if the number of bits processed by each processing unit is two, then the total number of processing units, total number of PE and PE2 is N/2 if N is even and (N+1)/2 if N is odd where N is the maximum number of bits of matrix A.

The multiplier 10 further includes a register column 20 comprising a plurality of registers. The operations of the processor element columns, i.e., columns 16 and 18, are carried out in conjunction with the registers of the register column 20 as described below. Since the operation of the register column 18 is identical to that of the register column 16, the following description for the register column 16 is also applicable to the register column 18. The matrix elements $a_{11}$, $a_{12}$, $a_{21}$, and $a_{22}$ of the two-by-two matrix A are inputted, one at a time, on lines 20-1 to the register column 20. Simultaneously, the matrix elements $b_{11}$, $b_{21}$, of one column of the matrix B. are inputted one at a time on line 34-1 to the first processor column PE (16-1) of the first column 16. Parallel processing is achieved by configuring the architecture of the multiplier such that the multiplication of each column of the matrix B can be simultaneously carried out by each column such as column 16. Since in a matrix multiplication, the first column of the matrix B are to be multiplied to the first and the second rows of the matrix A, each matrix element is inputted twice on line 34-1.

The first matrix element $a_{11}$ of the matrix A and the first matrix element $b_{11}$ of the matrix B are inputted in the same clock cycle to the multiplier 10 via lines 20-1 and 34-1 respectively. A tap line 38-1 is connected to the input lines of the first and the second bits of line 20-1 to feed the first and the second bits of the element a11 to the first processor element PE1 (16-1). The first and the second bits of $a_{11}$ are transmitted to a selector control input of a encoding and shifting multiplexer 36-1. The encoding and shifting multiplexer 36-1 also receives the element $b_{11}$ on line 34-1 as a data input. An encoding process is carried out in the encoding and shifting multiplexer 36-1 to perform a partial multiplication and shifting process of the first and second bits of $a_{11}$. A three-bit encoding table for generating a partial multiplication by the use of Modified Booth technique is shown in Table 1 wherein two new bits are processed each time. The lower bit of theses two new bits is denoted as bit b(i) and the higher bit as b(i+1) while the higher bit of last two bit is also used and is denoted as b(i−1). For the operation of the first two bits, the value of b(i−1) is designated to be zero.

TABLE 1

Modified Booth Table

| b(i + 1) | b(i) | b(i − 1) | operation |
|---|---|---|---|
| 0 | 0 | 0 | *0 |
| 0 | 0 | 1 | *1 |
| 0 | 1 | 0 | *1 |
| 0 | 1 | 1 | *2 |
| 1 | 0 | 0 | *(−2) |
| 1 | 0 | 1 | *(−1) |
| 1 | 1 | 0 | *(−1) |
| 1 | 1 | 1 | *0 |

Figure 2:
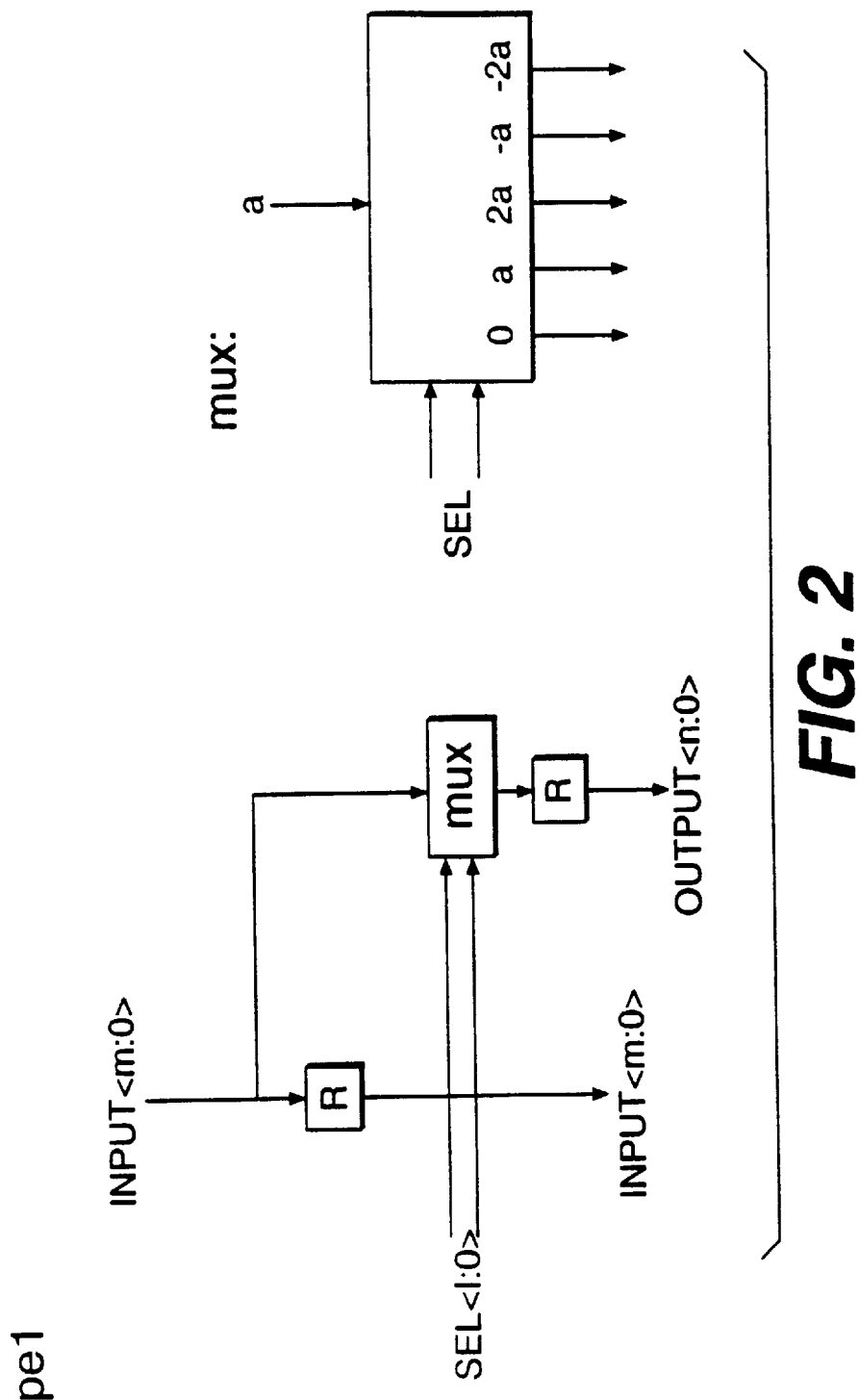
FIG. 2 shows a multiplexer for implementing a multiple bits encoding and shifting circuit structure for process-element-1 (PE1)

The operation of the encoding process as carried out by the encoding and shifitng multiplexer 36-1 for the first two bit as carried out in PE1 is depicted in FIG. 2. There are only two selected control values from these two bits. By assigning a value zero to the bit b(i−1), according to the modified booth table the multiplexer carries out an operation of *0, *1, *(−2), and *(−1). After the encoding process is performed, the encoding and shifting multiplexer 36-1 also performs a left-shift in shifting the partial product to the left for a predetermined number of bits, i.e., k bits, to generate a shifted partial product output This left shift operation trucates the least k bits from the partial product thus keep the bit-length of the shifted partial product generated by the encoding and shifting multiplexer 36-1 within a specific bit length. The shifted partial product generated by the encoding and shifting multiplexer 36-1 multiplexer is transmitted to register 24-1 via data transmission line 28-1 where it is stored by the falling edge of the clock cycle. In a preferred embodiment of the present invention, the number of bits shifted by the multiplexer 36-1 is two. This two bit shifting performed by the multiplexer 36-1 is selected such that the truncated errors generated by this two bit shifting for an 8×8 DCT matrix multiplication does not impact on the precision of the final products to satisfy the precision benchmark requirements under the CCITT (Comite Consultatif International du Telegraphe et des Telephones) proposed standard for IDCT. The use of this encoding and shifting multiplexer 36-1 thus provides a pipelined and parallel processing architecture with reduced circuit area on an IC chip while satisfying the CCITT standard for IDCT operations.

The value generated by the encoding and shifting mutliplexer 36-1 thus constitutes an approximate partial product of the first two input matrix elements $a_{11}$ and $b_{11}$. Meanwhile at the end of the dock cycle, these two matrix elements, i.e., $a_{11}$ and $b_{11}$, are transmitted via lines 21-1 and 32-1 to be stored in the registers 20-1 and 30-1 respectively. The operation of PE1 is completed for the first two input elements.

Figure 3:
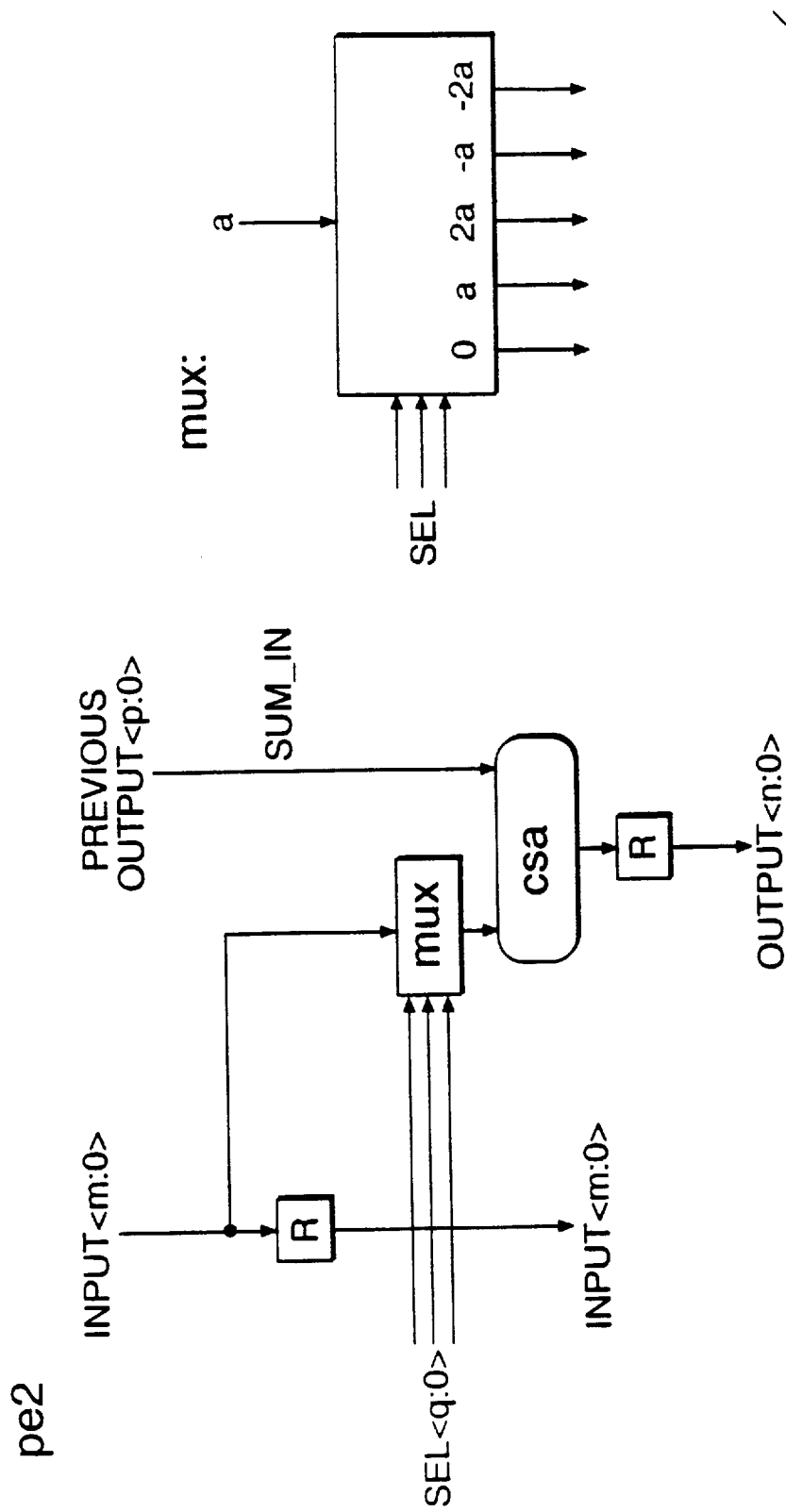
FIG. 3 shows a multiplexer for implementing the multiple bits encoding and shifting circuit structure for process-element-2 (PE2)

At the beginning of the next clock cycle, the next two input elements $a_{12}$ and $b_{21}$ are received by PE1 (16-1) to be processed in the same way as performed on $a_{11}$ and $b_{11}$. Meanwhile the multiplication of the next two bits of $a_{11}$ to the matrix element $b_{11}$ is carried out in next processor element PE2 (16-2). A tap line 38-2 transmits the second, third and the fourth bits of $a_{11}$ to the selector control input of the second encoding and shifting multiplexer 36-2 of the PE2 unit (16-2) and the matrix element $b_{11}$ is transmitted via line 34-2 to the second encoding and shifting multiplexer 36-2 also. Again the encoding table, i.e., Table 1, is used in the second multiplexer 36-2 to carry out the encoding and shifting operations to generate an approximate partial product. Referring to FIG. 3 where a multiplexer used in PE2 unit is shown. The first three bits of the input element $a_{11}$ are used as selector control input. Five types of operations are carried out depending on the value of the three bits, namely, they are *0, *1, *2, *(−1) and *(−2). Again, the second encoding and shifitng mutliplexer also shifts the partial product to the left by k bits thus trauncates the least bits from the partial product when the approximate partial product is outputted from the second multiplexer 36-2.

The approximate partial product generated by the second multiplexer 36-2 is transmitted via line 28-2 to an carry-save-adder (CSA) 24-2 which also receives the partial product stored in the register 24-1 of the PE1 unit 16-1 via line 26-1. The output data of the multiplexer 36-2 of the PE2 unit 16-2 represent the partial product resulting from operations performed on second, third and fourth bits of the data all, hence, the output of the multiplexer 36-2 must first be shifted left two bits with respect to the output from the encoding and shifting multiplexer 36-1. instead of a regular adder, the CSA 26-1 uses a 'carry and sum operation' to increase the through-put of the processor element units. The 'carry and sum' operation is based on the operation that an 'exclusive OR' operation is performed on every bit to compute the 'sum' without carrying over and then applies an AND operation on every bit to compute the 'carry' and the real sum can then be obtained by adding the 'sum' and the 'carry'.

By the falling of the second clock, a new set of 'carry' and 'sum' is stored in the addition register 24-2 and the input all is then transmitted to a register 20-3 via lines 21-2 of the register column 20 for storage. Similarly, the matrix element $b_{11}$ transmitted via the lines 32-2 to a register 30-2 in the PE2 unit 16-2 where it is stored for further processed. Meanwhile, the second pair of matrix elements $a_{12}$ and $b_{21}$ and their carry and sum are stored in the registers 20-1 of the register column and the registers 30-1 and 24-1 respectively.

Figure 4:
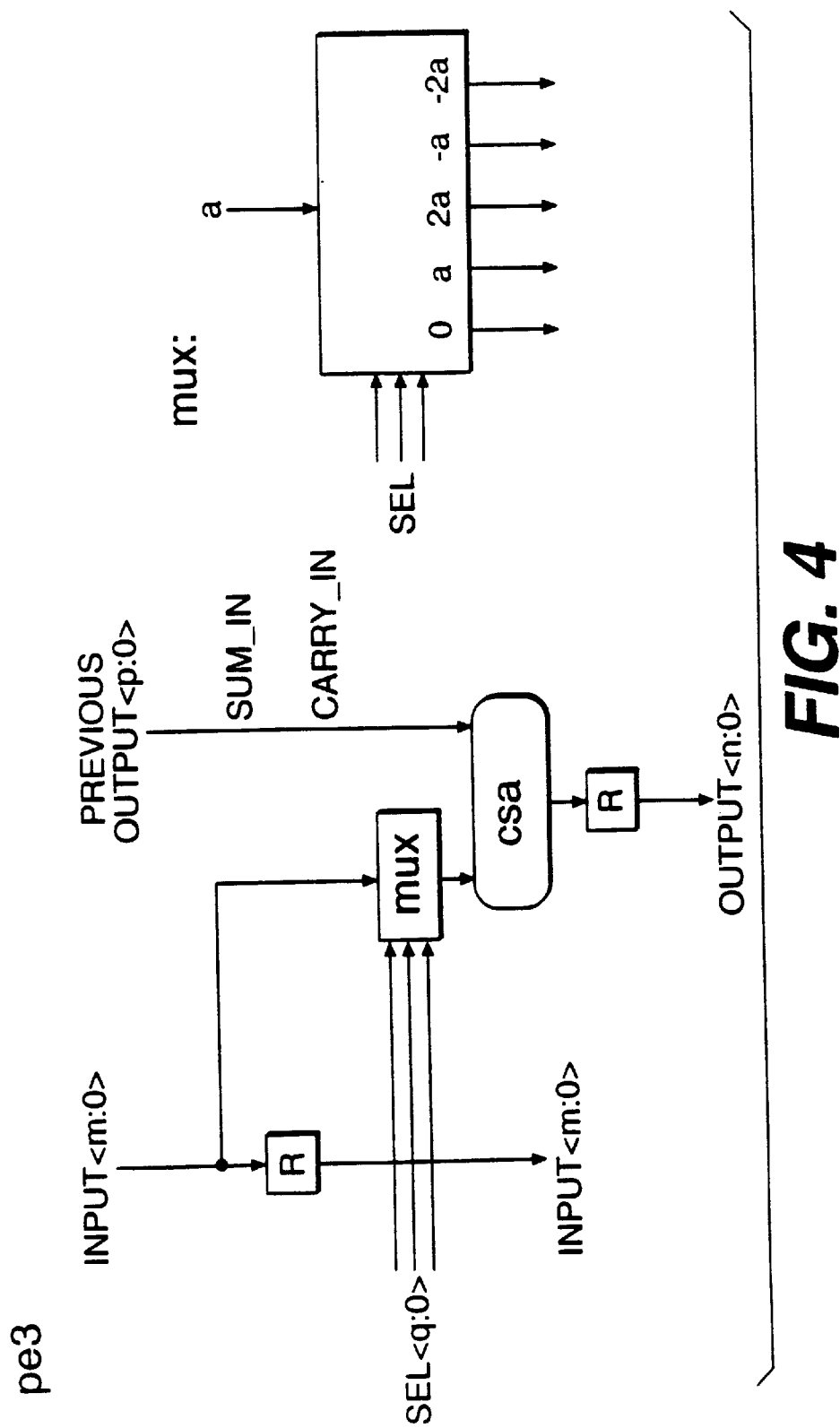
FIG. 4 shows a multiplexer for implementing the multiple bits encoding and shifting circuit structure for process-element-3 (PE3)

At the beginning of each clock cycle the data are being processed in a pipeline manner from the top to the bottom with each processor element unit performing different stages of multiplication. A PE3 unit (16-3) is provided at the bottom of the processing element column 16. Similar to PE2, the encoding and shifting circuit structure and operation are implemented in multiplexer 36-3. The detail of the multiplexer 36-3 is shown in FIG. 4.

Continuing with the operation of the processing element column 16, the final set of 'sum' and 'carry' of the first pair of matrix elements $a_{11}$ and $b_{11}$ may be obtained from the additional register 24-3 when every bit of $a_{11}$ is processed. The value of $a_{11}$ multiplied by $b_{11}$ is obtained by adding the final set of 'sum' and 'carry' stored in the register 24-3 in an add-up register 24-4.

The product $a_{11}b_{11}$ is transmitted via line 26-3 to an accumulator 40. The accumulator 40 has a feed back path 46 so that the first product $a_{11}b_{11}$ may be looped back to the accumulator 40. One clock cycle after the completion of the product $a_{11}b_{11}$, the accumulator 40 receives the second product $a_{12}b_{12}$ via line 26-3. These two products are added and stored in the accumulator 40.

At the next clock cycle, a third product $a_{21}b_{11}$ reaches the accumulator 40 via line 26-3. The content of the accumulator 40, i.e., $c_{11}$ which is the sum of $a_{11}b_{11}$ and $a_{12}b_{21}$ is transmitted via line 42 to a register 44. The register 44 is then connected to either an output port or another processing circuit for further processes. Two clock cycles after $c_{11}$ reaches the register 44, $c_{21}$, which is another matrix element of matrix C, is also transmitted via line 42 to the register 44 ready for output or for further processing.

Since the first matrix element of the matrix C, i.e., $c_{11}$ is the sum of the products of the first row of A to the first column of B, an accumulator 40 and an associated register 44 are used to compute the final value of $c_{11}$. The details of data processing in the accumulator 40 and the register 44 are the same as that for the U.S. Pat. No. 5,204,830 which is incorporated herein by reference thereto.

Thus, the processing element column 16 is capable of sequentially and continuously generating a series of products of a plurality of pairs of input data and to compute the sum of these products. When the pairs of the input data are properly arranged, the processing element column 16 is capable of generating a matrix element resulting from the multiplication of a row of a first matrix to a column of a second matrix.

By a similar process, the processing element column 18 may sequentially receive the matrix elements of a second column of the matrix B to generate the matrix elements of the second column of the matrix C. The processing element columns 16 and 18 can perform the task of multiplication concurrently in a synchronizing manner. The output of columns 16 and 18 can further be used for a two-by-two direct-cosine-transform (DCT) calculation. A second stage multiplier similar to the multiplier 10 is used to carry out another matrix multiplication. The details of a DCT multiplication circuit are described in an eight-by-eight DCT circuit below.

Figure 5:
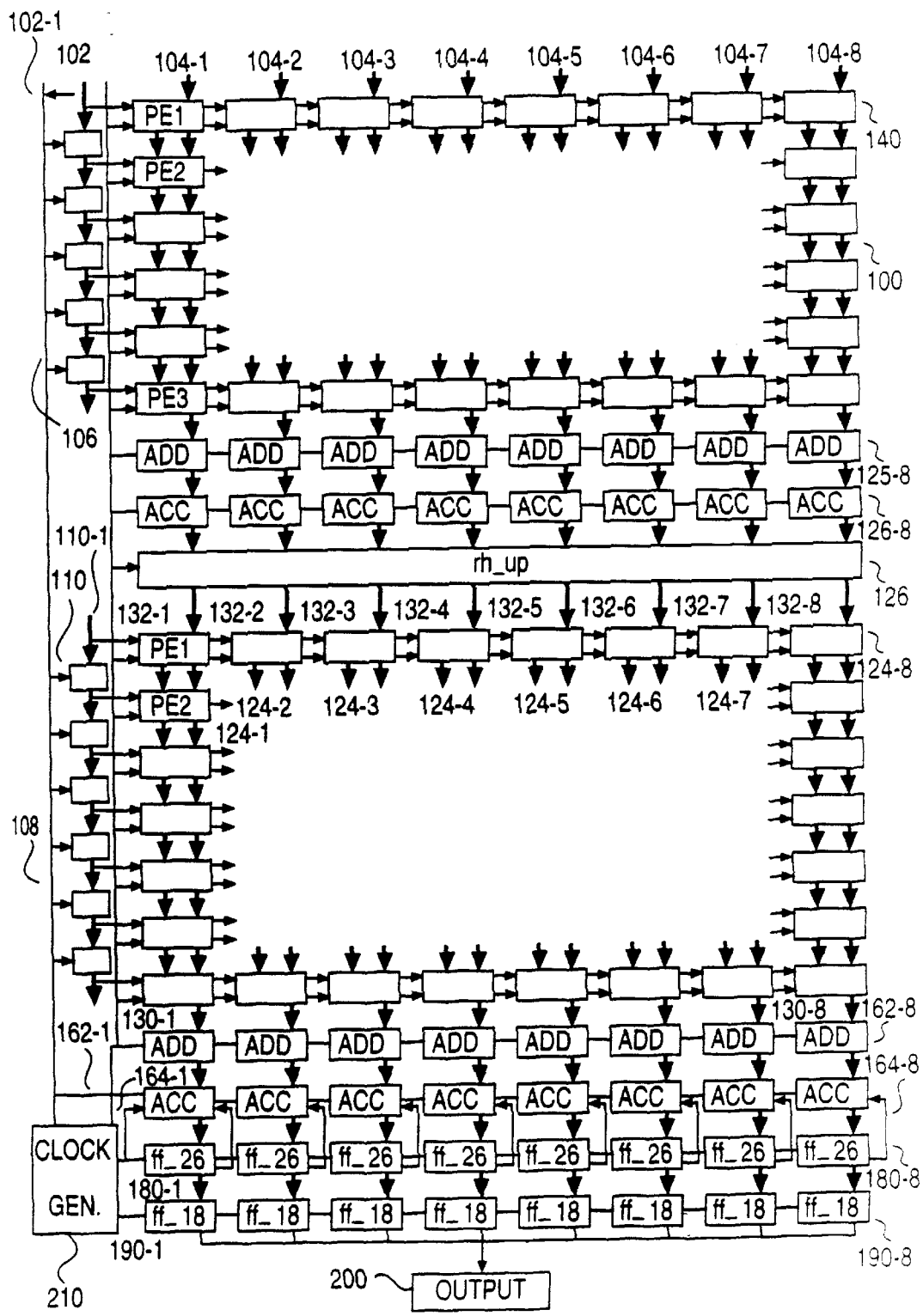
FIG. 5 shows a modular circuit for performing a eight-by-eight DCT process.

FIG. 5 shows a modular circuit 100 for performing an eight-by-eight DCT process. The DCT circuit 100 comprises two stages, a first stage 106 for computing $Y=XC^t$ and a second stage 108 for computing $Z=CY$. The first stage includes a register column 102 having a plurality of registers connected in tandem for transmitting input data, i.e., the matrix elements, sequentially one clock cycle per register from the top to the bottom in a time progressive manner. The first stage 106 further comprises eight processing element columns 104-1 to 104-8. Each processing element column 104-1 to 104-8 has a PE1 unit 140 which is identical to the PE1 units 16-1 and 18-1 of the circuit 10 depicted in FIG. 1. The first stage further comprises PE2 and PE3 units which are also identical to the PE2 and PE3 units of the circuit 10 depicted in FIG. 1.

In carrying out the multiplication process, an encoding and shifting multiplexer circuit is utilized to process multple bits in each of the PE units. When the encoding and shifting multiplexer circuits processes two bits each time for a pipelined matrix multiplier, the total number of PE1 and PE2 units as described for the multiplication 10 equals to N/2 if N is an even integer and (N+1)/2 if N is an odd integer where N is the number of bits of the input elements stored in the register column 102.

As with the two-by-two multiplication circuit 10 of FIG. 1, each process element of the column 104-1 to 104-8 receives two inputs. The elements of the first data matrix X, one element per cycle, are sequentially input to the register column 102. These matrix elements are then transmitted one register per cycle to the next lower register in the register column 102. In each clock cycle two new bits from each of the registers in the register column 102 are transmitted to a corresponding PE unit in each of the processing element units 104-1 to 104-8. A partial multiplication and shifting process is then carried out in a pipelined manner in each PE unit concurrently for each row and the corresponding columns. Each processing element column 104-1 to 104-8 generates one column of elements of the intermediate matrix Y. At the bottom of each processing element column, eight products are added to compute a matrix element of the intermediate matrix Y. After the completion of calculation for each of the matrix element, the matrix element are transmitted via line 132-1 to 132-8 to be further processed by a second stage multiplier 108.

Similar to the first stage 106, the second stage 108 also includes a register column 110 and eight processing element columns 124-1 to 124-8 wherein each column also has PE1, PE2 and PE3 units to perform the matrix computation Z=CY. By use of the multiple bit encoding and shifting multiplexer circuit, the total number of PE1 and PE2 units are approximately half of the number of bits of the matrix elements stored in the register column 110. The sequence of operation are identical to that of the first stage 106. The final products of each processing element columns are transmitted via lines 130-1 to 130-8 to an array of eight adders 162-1 to 162-8 where the carry and the sum are added to obtain the final values of the products.

Figure 6:
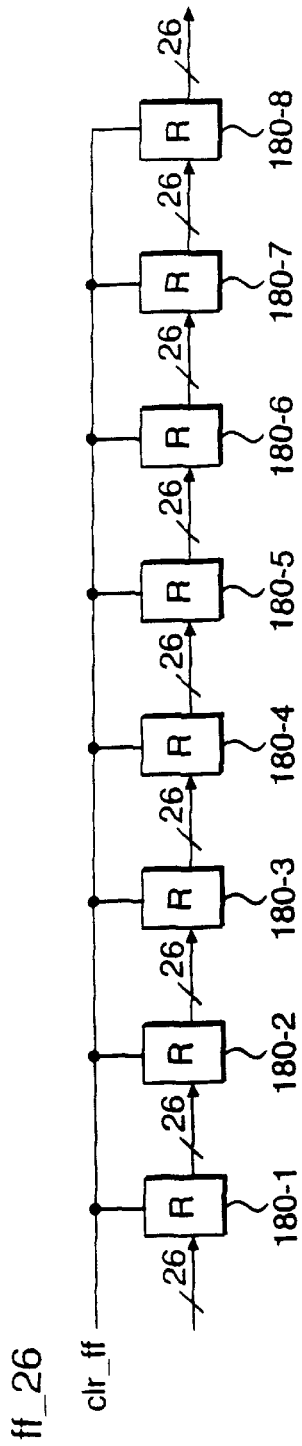
FIG. 6 shows an array of temporary storage registers ff_26.
Figure 7:
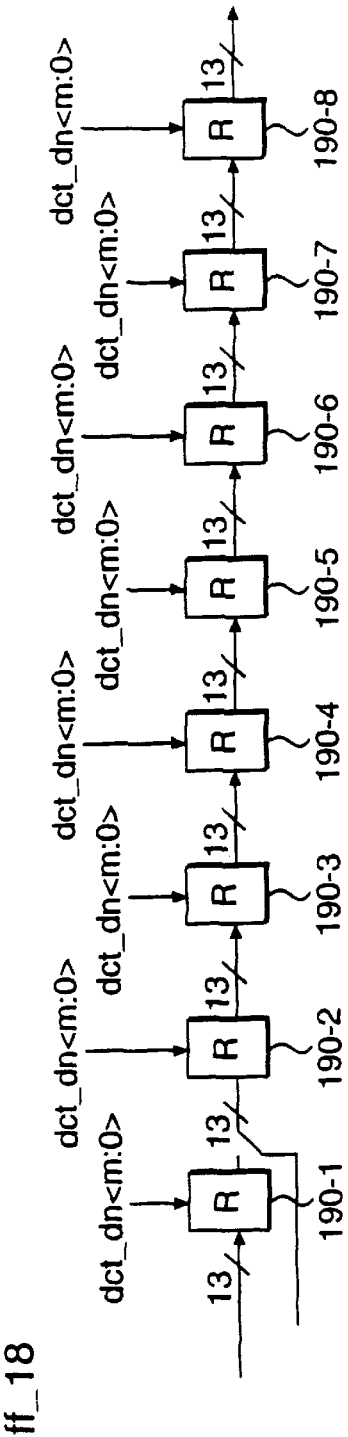
FIG. 7 shows an array of output registers ff_18.

The products as calculated in adders 162-1 to 162-8 are transmitted to an array of accumulators 164-1 to 164-8 to be further processed. By examining the matrix multiplication of matrix C and matrix Y, each element of the matrix Z is the sum of the the products of one row of matrix C to one column of the matrix Y. However, from the output of the first stage 106, the sequence of matrix elements are generated for each row of the matrix Y. In U.S. Pat. No. 5,204,830, two switch array boxes and an accumulator array of sixty-four accumulators are used to properly accumulate all sixty-four elements and to compute the final two-dimensional DCT elements. FIG. 5 shows a simplified row-colum circular shifting circuit which uses a less complicated circuit design to achieve further savings of the IC chip areas occupied by the eight-by-eight DCT circuit 100. The row-colum circular shifting circuit includes an array of temporary storage registers 180-1 to 180-8 and an array of output registers 190-1 to 190-8 are used wherein each of the temporary storage registers and the output registers includes eight shift registers. The details of the temporary storage registers are shown in FIG. 6 as ff_26 because each shift register has twenty-six bits, and that of the output registers are shown in FIG. 7 as ff_18 because each shift register has eighteen bits.

Since the summation operations in the accumulator 164-1 to 164-8 are only performed every eighth clock cycle, the sum obtained in the accumulators 164-1 to 164-8 are first transmitted to the temporary storage registers 180-1 to 180-8 of the row-colum circular shifting circuit The data stored in the first shift register of the temporary storage register 180 are shift to the right each clock cycle and circularly looped back at the beginning of every ninth clock cycle to be added to the value in the accumulators 164-1 to 164-8. Then, at the beginning of every clock cycle, the data in the temporary storage registers 180-1 to 180-8 are shifted to the right to the next shift register when the newly calculated value in the accumulators 164-1 to 164-8 are stored in the first shift registers. At the completion of the calculation of the first row of the matrix Z at the beginning of the fifty-seventh clock cycle, all the matrix elements are transmitted to the first output register 190-1 in parallel. Similarly, at the completion of the second row of the matrix Z, the matrix elements are transmitted to the output register 190-2 in parallel, etc. These data are further transmitted in serial through the serial output port to a round unit 200 for final processing to be utilized in a HDTV system or in other types of applications.

Figure 8:
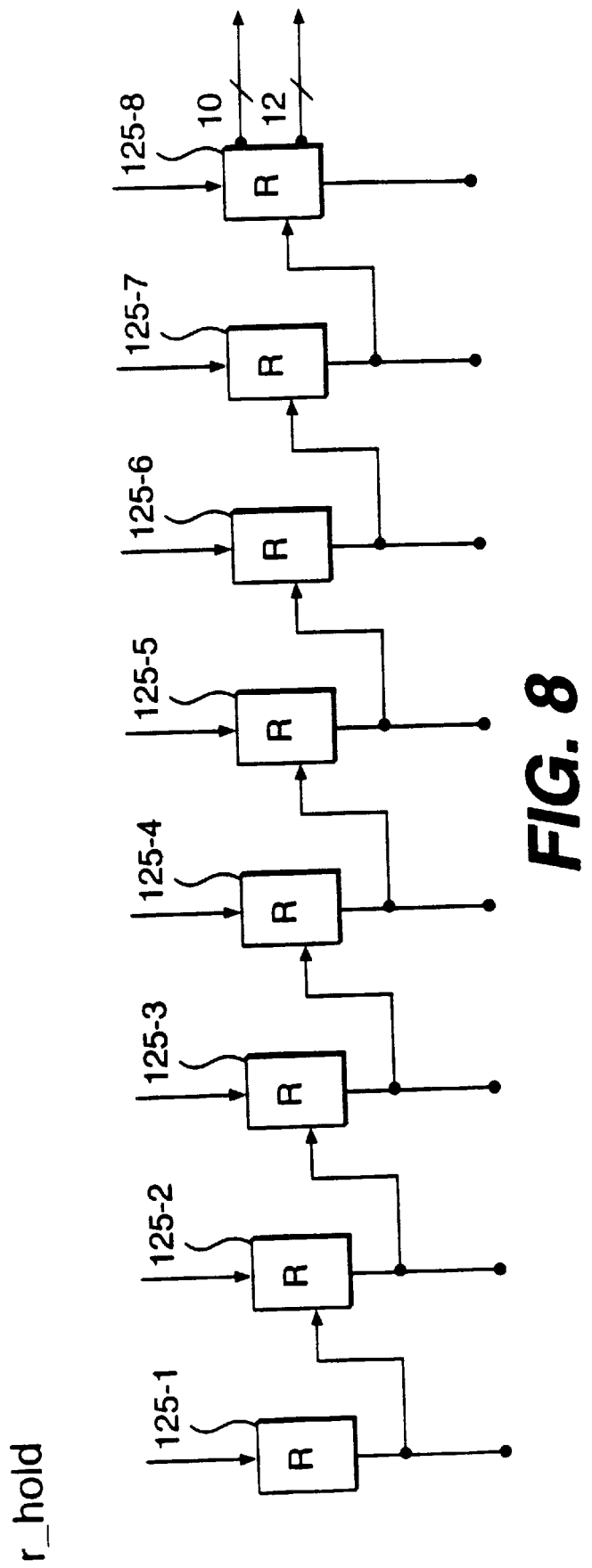
FIG. 8 shows an array of holding registers for performing an intermediate testing.

The DCT circuit 100 further has a holding register 126 for the dual purposes of reading input DCT matrix coefficients and for performing an intermediate testing. FIG. 8 shows the circuits of the holding register 126. At the completion of multiplication operation, the value of the product is stored in the accumulators 125-1 to 125-8. In the preferred embodiment as shown, the holding registers has two serial bi-directional ports, a 10-bit serial port and a 12-bit serial port These ports can be used for reading the DCT matrix coefficients so that the second stage DCT calculations can be performed. Also, for the purpose of testing, the higher bits of the products for testing, i.e., bits 1 to bits 12, are read from the 12-bit serial port and the lower bits of the products for testing, i.e., bit 13 to bit 22, are read from the 10-bit serial port. Since there are seven clock cycles, the product of two matrix elements must be temporarily stored before an add operation can be performed in this eight-by-eight DCT calculation. The data are read in the predefined clock cycles without interfering with the normal operation of the DCT tasks and the input of the matrix coefficients. By making the data input port a bi-directional serial port, the circuit 100 is able to provide additional capabilities for performing an intermediate testing without adding cost to the circuit design.

In addition to the circuit elements discussed above, the two stage eight-by-eight DCT circuit 100 also has clock generator 210 and coefficient supply means (not shown) to provide the DCT coefficients. The details of these elements and the carry-save-adder (CSA) are identical to that provided in the U.S. Pat. No. 5,204,830 by the common inventor of the present invention.

Comparing with the disclosure made in U.S. Pat. No. 5,204,830, the number of processor element units, i.e., the total number of PE1 and PE2, is reduced to approximately half in the present invention. In order to satify the CCITT IDCT precision standards, the pipelined matrix multiplier may be connected to a pre-weighting circuit to multiple the input data with a pre-selected weighting factor such that the truncation errors generated by the operations by the multiple bits encoding and shifting multiplexer will not degrade the precision of the approximate products included in the IDCT matrix according to the CCITT standards. By including this pre-weighting circuit, the multiplication circuit can be simplfied by allowing the truncation of a number of least significant bits thus further reduces the circuit areas occupied by the multiplier circuits.

Similar to the U.S. Pat. No. 5,204,830, a two stage circuit can be used to perform the DCT transform in a time progressive pipeline manner wherein the multiplication of each row of the second matrix is processed in parallel. The present invention however has the advantage that the number of processor element units, i.e, the number of PE1 and PE2 is reduced in most cases by approximately fifty percent. This is achieved by use of the multiple bits encoding and shifting multiplexer circuit which enables each the processor element units to process multiple new bits instead of one, thus reducing the circuits required to process the same amount of data. The data processing through-put is also increased because that multiple bits are processed in each clock cycle in the processor element units PE1 and PE2 and that CSA are used wherein the operation is more efficient because simple exclusive OR and AND logic operations are carried out without the ripple effect caused by the carry-over which often occurs in the regular adders.

The saving of the 'real estate' on an IC chip becomes more important as the number of columns and rows of the matrixes are increased and the number of bits for the data to be processed are large. In order to integrate multiple functions in a single chip, the useful areas on an IC chip available for one type of circuit, e.g. circuits for DCT transform thus becomes more limited. The present invention teaches a pipeline multiplication circuit which is capable of overcoming the potential limitations in the prior art. Specifically, the reduction of IC circuit areas required by this compact pipelined matrix multiplier is achieved by the use of (1) the multiple bits encoding and shifting multiplexer circuit which processes a plurality of bits in each clock cycle to obtain approximate partial product, and (2) a novel row-column circular shifting circuit which takes advantage of the periodic nature of the matrix multiplication between the rows and the columns between two matrixes to continuous shift to the right and then to loop back after a specific clock cycles, i.e., the number of rows for accumulation, in order to compute the sums of the products of the rows to the columns.

In addition to the advantages described above, the compact pipelined matrix multiplier disclosed in this invention also provides a matrix multiplication circuit which utilizes a simplified circuit to obtain approximate matrix multiplication results while satisfies the precision benchmark requirements under the CCITT proposed standard for IDCT to achieve the purpose that the circuit area on an IC chip is reduced. Furthermore, the compact pipelined matrix multiplier provides a circuit structure allows intermediate testing functions to be readily performed to check the accuracy of the multiplication.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A truncated-pipelined multiplication circuit for multiplying a first number F by a second number S wherein M being the maximum number of bits of said first number and M being a positive integer, thus a bit-sequence of said first number is $F=b(M)b(M-1)b(M-2)\ldots b(2)b(1)$, comprising:

a first number register column including L sequentially t down connected first number registers represented by $R1(i)$ where $i=1,2,3,\ldots L$, for receiving, temporary storing, and transferring said first number F sequentially from one of said registers to a next register wherein $L=M/2$ if M being an even integer or $L=(M+1)/2$ if M being an odd integer;

a processing column including L sequentially top-down connected processing elements (PEs) represented by $PE(i)$ wherein each of said PE(i) further including a second number register $R2(i)$, an encoding and shifting multiplexer $MX(i)$, and an accumulating register $RA(i)$;

a second number input line for inputting said second number S;

each of said second number registers $R2(i)$ is connected to said second number input line for receiving, temporary storing and sequentially transferring said second number S to a next second number register $R2(i)$ in a top-down fashion;

each of said encoding and shifting multiplexer $MX(i)$ is connected to a second number register $R2(i)$ of a same PE(i) for receiving said second number S therefrom;

each of said encoding and shifting multiplexer $MX(i)$ is further connected to a corresponding first number register $R1(i)$ to sequentially receive a plurality of bits of said first number F therefrom, wherein said encoding and shifting multiplexer MX(1) of a first FE receiving two least significant bits $b(1)b(2)$ from a first number register $R11(1)$, and said encoding and shifting multiplexers $MX(i)$ of remaining (L-1) $PE(j)$, $j=2,3,4,\ldots L$, each sequentially receiving three bits $b(k-2)b(k-1)b(k)$ where $k=2j$;

each of said encoding and shifting multiplexer $MX(i)$ sequentially applying said plurality of bits of said first number F and said second number S to perform a truncated encoding operation by employing a Modified Booth table to obtain a truncated partial product of said second number S to said plurality bits of said first number F with t-least-significant bits truncated where t is a positive integer, to obtain a truncated partial product $TPP(i)$; and each of said accumulating register $RA(i)$ receiving said truncated partial product $TPP(i)$ and a partial accumulated sum $PAS(i-1)$ from a prior accumulating register $RA(i-1)$ sequentially to perform an add-operation to obtain a current partial accumulated sum $PAS(i)$ wherein a last accumulating register $RA(L)$ obtaining a truncated final product of said first number F to said second number S in a top-down sequential fashion.

2. The truncated pipelined multiplication circuit of claim 1 wherein:

said multiplication circuit is further connected to and controlled by a clock issuing a sequence of clock cycles Ti and said first number register $R1(i)$ and said second number input line each receives, in each of said clock cycles Ti, a pair of first numbers $F(Ti)$ and a second numbers $S(Ti)$ respectively therefrom; and said multiplication circuit further includes a product-accumulating means connected to said accumulating register $RA(L)$ of the last PE unit $PE(L)$ for sequentially adding said complete final-product of said first number to said second number to compute a total sum of $F(Ti)S(Ti)$ over said plurality of clock cycles Ti.

3. The truncated pipelined multiplication circuit of claim 2 wherein:

said multiplication circuit further connected to a pre-weighting circuit wherein said first number register and said second number register contained therein each receives from said pre-weighting circuit, in each of said clock cycles Ti, a plurality of said first pre-weighted numbers $WF(Ti)$ and said second pre-weighted numbers $WS(Ti)$ respectively therefrom for performing a pre-weighting operation therein whereby said total sum of $F(Ti)S(Ti)$ over said plurality of clock cycles Ti satisfies a precision requirement.

4. The truncated pipelined multiplication circuit of claim 2 wherein:

each said accumulating register $RA(j)$, $j=2,3,4,\ldots L$ is a carry-save adder (CSA) to perform an add-operation to obtain said current partial accumulated sum $PAS(i)$.

5. The truncated pipelined multiplication circuit of claim 2 wherein:

said plurality of PE units for receiving and processing the multiplication of said first numbers $F(Ti)$ to said second numbers $S(Ti)$ form a first parallel PE column $PE1(i)$; and said pipelined multiplication circuit further includes a plurality of parallel PE columns PE($\lambda$), 1=2,3,4, . . . N and N is a positive integer, each being identically connected to said first number register R1(i) as said first parallel PE column PE1(i) wherein each of said PE columns PE($\lambda$) being utilized for computing the product of-said first number F(Ti) to a corresponding sequence of second numbers S($\lambda$, Ti).

6. The truncated pipelined multiplication circuit of claim 5 wherein:

said first number register R1(i) receives in sequence matrix elements according to an order from a sequence of rows of a first matrix; and each of said parallel PE columns PE($\lambda$) receives in corresponding sequence of the columns from the matrix elements of a second matrix whereby said multiplication circuit performs a truncated multiplication of said first matrix to said second matrix.

7. A truncated pipelined matrix multiplication circuit comprising:

a first stage for multiplying a first matrix X to a second matrix A wherein said first matrix X having matrix elements $x_{ij}$ where i=1,2,3, . . . I, and j=1,2,3, . . . J, and said second matrix having matrix elements $a_{jk}$ where k=1,2,3, . . . K, wherein M being a positive integer and the maximum number of bits of said matrix elements $x_{ij}$, and said first stage including:

a first plurality of pipeline circuits each operating in parallel for sequentially generating elements $y_{jk}$ represented by:

$$y_{ik} = \sum_{j=1}^{J} x_{ij} a_{jk}$$

of an intermediate product matrix Y=XZ for a particular value of k;

each of said pipeline circuits including a matrix X register column including L sequentially connected matrix X registers RX($\lambda$), $\lambda$=1,2,3, . . . L, for receiving, temporary storing, and transferring said matrix elements $x_{ij}$ of said matrix X sequentially from one of said registers RX($\mu$) to a next register RX($\lambda$+1) wherein L being a positive integer and L=M/2 if M being an even integer or L=(M+1)/2 if M being an odd integer;

each of said pipeline circuits further including k parallel PE columns PE($\kappa$), $\kappa$=1,2,3, . . . ,k, each including a plurality of sequentially connected PE units PE($\kappa$,$\lambda$) for receiving said $a_{jk}$ and for processing a partial product of said $x_{ij}a_{jk}$ by utilizing a multiple bits encoding and shifting multiplexer for processing a plurality of bits and then shifting a partial product for generating an truncated partial product;

wherein each of said PE($\kappa$,$\lambda$) further having a matrix A register RA($\kappa$,$\lambda$), an encoding and shifting multiplexer MX($\kappa$,$\lambda$), and an accumulating register AR($\kappa$,$\lambda$);

each of said matrix A registers RA($\kappa$,$\lambda$) receiving, temporary storing and sequentially transferring said matrix element $a_{jk}$ to a next second number register RA($\kappa$,$\lambda$) in a top-down fashion:

each of said encoding and shifting multiplexer MX($\kappa$,$\lambda$) is connected to a matrix A register RA($\kappa$,$\lambda$) of a same PE($\kappa$,$\lambda$) for receiving said matrix A element $a_{jk}$ therefrom;

each of said encoding and shifting multiplexer MX($\kappa$,$\lambda$) is further connected to a corresponding matrix X register RX($\lambda$) to sequentially receive a plurality of bits of said matrix X element $x_{ij}$ therefrom, wherein said encoding and shifting multiplexer MX($\kappa$,1) of a first PE receiving two least significant bits b(1)b(2) from a first matrix A register RA($\kappa$,1), and said encoding and shifting multiplexers MX($\kappa$,$\lambda$) of remaining (L-1) PE($\kappa$,$\phi$), $\phi$=2,3,4, . . . L, each sequentially receiving three bits b($\upsilon$−2)$\beta$($\upsilon$−1)$\beta$($\upsilon$) where $\upsilon$=2$\phi$;

each of said encoding and shifting multiplexer MX($\kappa$,$\lambda$) sequentially applying said plurality of bits of said first matrix X elements and said matrix A elements to perform a truncated encoding operation by employing a Modified Booth table to obtain a truncated partial product of said matrix A element to said plurality bits of said matrix X element with t-least-significant bits truncated where t is a positive integer, to obtain a truncated partial product TPP($\kappa$,$\lambda$); and each of said accumulating register RA($\kappa$,$\lambda$) receiving said truncated partial product TPP($\kappa$,$\lambda$) and a partial accumulated sum PAS($\kappa$,$\lambda$−1) from a prior accumulating register RA($\kappa$,$\lambda$−1) sequentially to perform an add-operation to obtain a current partial accumulated sum PAS($\kappa$,$\lambda$) wherein a last accumulating register RA($\kappa$,L) of said first stage obtaining a truncated final product sum $y_{ik}$ of said matrix X elements to said matrix A elements in a top-down sequential fashion, a second stage for receiving the elements $y_{ik}$ as said element $y_{ik}$ is being outputted by said first stage and for multiplying said element $y_{ik}$ to a third matrix C having element $c_{li}$, said second stage wherein M' being a positive integer and M' being the maximum number of bits of said matrix elements $y_{ik}$ and $c_{li}$, comprising:

second plurality of pipeline circuits each operating in parallel for sequentially generating an product $c_{li}y_{jk}$ for a particular value k;

each of said second plurality pipeline circuits being configured in likewise structure as in said first stage including a second matrix register column including L' sequentially connected first matrix registers for receiving, temporary storing, and transferring said matrix elements $y_{jk}$ from said first stage sequentially from one of said registers to a next register wherein L' being a positive integer and L'=M'/2 if M' being an even integer and L'=(M'+1)/2 if M' being an odd integer;

each of said second plurality of pipeline circuits further including k parallel PE columns each including L' sequentially connected PE units for receiving said $c_{li}$ and for processing a partial product of said $c_{li}y_{jk}$ by utilizing a multiple bits encoding and shifting multiplexer for processing a plurality of bits and then shifting a partial product for generating a truncated partial product; and a column accumulator means corresponding to each of said PE columns wherein each of said accumulator means-selectively accumulating products $c_{li}y_{jk}$ for a particular value of 1 from said associated pipeline circuit so that each accumulator means generates the elements:

$$z_{lk} = \sum_{i=1}^{I} c_{li} y_{jk}$$

for a product matrix Z=CY.

8. The truncated matrix multiplication circuit of claim 7 wherein:

said matrix C comprises sampled cosine coefficients, said matrix A is the transpose of said sampled cosine coefficient matrix C and said matrix X comprises data to be a discrete cosine transform (DCT) computation.

9. The truncated matrix multiplication circuit of claim 8 further comprises:
   a holding register stage wherein a holding register is provided for each of said parallel PE columns of said first stage for temporarily holding each of said products $x_{ij}a_{jk}$ wherein each of said holding registers including two bidirectional ports whereby each of said products $x_{ij}a_{jk}$ can be intermediately tested.

10. A truncated matrix multiplication circuit comprising:
    a first stage for multiplying a first matrix X to a second matrix A wherein said first matrix X having matrix elements $x_{ij}$ where i=1,2,3, ... I, and j=1,2,3, ... J, and said second matrix having matrix elements $a_{jk}$ where k=1,2,3, ... K, wherein M being a positive integer and the maximum number of bits of said matrix elements $x_{ij}$, and said first stage including:
    a first plurality of pipeline circuits each operating in parallel for sequentially generating elements $y_{ik}$ represented by:

$$y_{ik} = \sum_{j=1}^{J} x_{ij}a_{jk}$$

of an intermediate product matrix Y=XZ for a particular value of k;
        each of said pipeline circuits including a matrix X register column including L sequentially connected matrix X registers RX($\lambda$), $\lambda$=1,2,3, ... L, for receiving, temporary storing, and transferring said matrix elements $x_{ij}$ of said matrix X sequentially from one of said registers RX($\mu$) to a next register RX($\lambda$+1) wherein L being a positive integer and L=M/2 if M being an even integer or L=(M+1)/2 if M being an odd integer;
        each of said pipeline circuits further including k parallel PE columns PE($\kappa$), $\kappa$=1,2,3, ... ,k, each including a plurality of sequentially connected PE units PE($\kappa$,$\lambda$) for receiving said $a_{jk}$ and for processing a partial product of said $x_{ij}a_{jk}$ by utilizing a multiple bits encoding and shifting multiplexer for processing a plurality of bits and then shifting a partial product for generating an truncated partial product;
    wherein each of said PE($\kappa$,$\lambda$) further having a matrix A register RA($\kappa$,$\lambda$), an encoding and shifting multiplexer MX($\kappa$,$\lambda$), and an accumulating register AR($\kappa$,$\lambda$);
        each of said matrix A registers RA($\kappa$,$\lambda$) receiving, temporary storing and sequentially transferring said matrix element $a_{jk}$ to a next second number register RA($\kappa$,$\lambda$+1) in a top-down fashion;
        each of said encoding and shifting multiplexer MX($\kappa$,$\lambda$) is connected to a matrix A register RA($\kappa$,$\lambda$) of a same PE($\kappa$,$\lambda$) for receiving said matrix A element $a_{jk}$ therefrom;
        each of said encoding and shifting multiplexer MX($\kappa$,$\lambda$) is further connected to a corresponding matrix X register RX($\lambda$) to sequentially receive a plurality of bits of said matrix X element $x_{ij}$ therefrom, wherein said encoding and shifting multiplexer MX($\kappa$,1) of a first PE receiving two least significant bits b(1)b(2) from a first matrix A register RA($\kappa$,1), and said encoding and shifting multiplexers MX($\kappa$,$\lambda$) of remaining (L-1) PE($\kappa$,$\phi$), $\phi$=2,3,4, ... L, each sequentiality receiving three bits b($\upsilon$-2)$\beta$($\upsilon$-1)$\beta$($\upsilon$) where $\upsilon$=2$\phi$;
        each of said encoding and shifting multiplexer MX($\kappa$,$\lambda$) sequentially applying said plurality of bits of said first matrix X elements and said matrix A elements to perform a truncated encoding operation by employing a Modified Booth table to obtain a truncated partial product of said matrix A element to said plurality bits of said matrix X element with t-least-significant bits truncated where t is a positive integer, to obtain a truncated partial product TPP($\kappa$,$\lambda$); and each of said accumulating register RA($\kappa$,$\lambda$) receiving said truncated partial product TPP($\kappa$,$\lambda$) and a partial accumulated sum PAS($\kappa$,$\lambda$-1) from a prior accumulating register RA($\kappa$, $\lambda$-1) sequentially to perform an add-operation to obtain a current partial accumulated sum PAS($\kappa$,$\lambda$) wherein a last accumulating register RA($\kappa$,L) of said first stage obtaining a truncated final product sum $y_{ik}$ of said matrix X elements to said matrix A elements in a top-down sequential fashion;
    a second stage for receiving the elements $y_{ik}$ as said element $y_{ik}$ is being outputted by said first stage and for multiplying said element $y_{ik}$ to a third matrix C having element $c_{li}$, said second stage wherein M' being a positive integer and M' being the maximum number of bits of said matrix elements $y_{ik}$ and $c_{li}$, comprising:
    a second plurality of pipeline circuits each operating in parallel for sequentially generating an product $c_{li}y_{jk}$ for a particular value k;
        each of said second plurality pipeline circuits being configured in likewise structure as in said first stage including a second matrix register column including L' sequentially connected first matrix registers for receiving, temporary storing, and transferring said matrix elements $y_{jk}$ from said first stage sequentially from one of said registers to a next register wherein L' being a positive integer and L'=M'/2 if M' being an even integer and L'=(M'+1)/2 if M' being an odd integer;
        each of said second plurality of pipeline circuits further including k parallel PE columns each including L' sequentially connected PE units for receiving said $c_{li}$ and for processing a partial product of said $c_{li}y_{jk}$ by utilizing a multiple bits encoding and shifting multiplexer for processing a plurality of bits and then shifting a partial product for generating a truncated partial product;
    a column accumulator means corresponding to each of said PE columns wherein each of said accumulator means-selectively accumulating products $c_{li}y_{jk}$ for a particular value of 1 from said associated pipeline circuit so that each accumulator means generates the elements:

$$z_{lk} = \sum_{i=1}^{I} c_{li}y_{jk}$$

for a product matrix Z=CY;
        an array of serially inter-connected circular shift registers each corresponding to one of said I column accumulator means for receiving a computed value of said $c_{li}y_{jk}$ for a present clock cycle and for shifting a value of $c_{li}y_{jk}$ for a last clock cycle to a next-right shift register, each of said inter-connected shift registers further being controlled to loop back to said accumulator means said value of $c_{li}y_{jk}$ in a (I+1) dock cycle for computing a value of $Z_{lk}$ as sum of said $c_{li}y_{jk}$; and
        each of said I column accumulator means further including an output register for outputting a final computed value of $Z_{lk}$.

* * * * *